2 Sheets--Sheet 2.

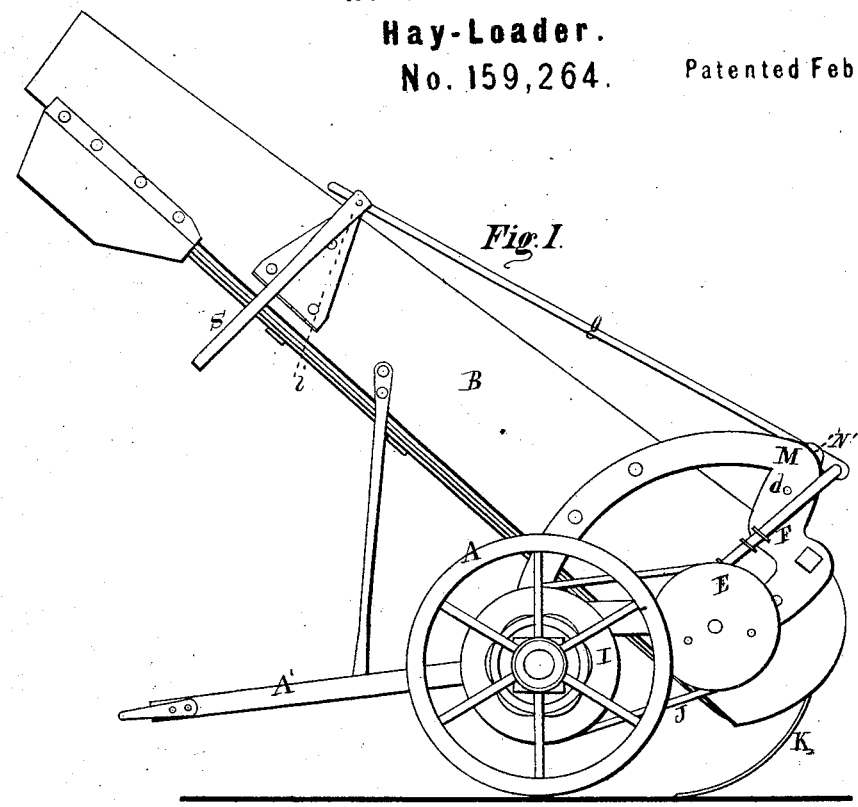
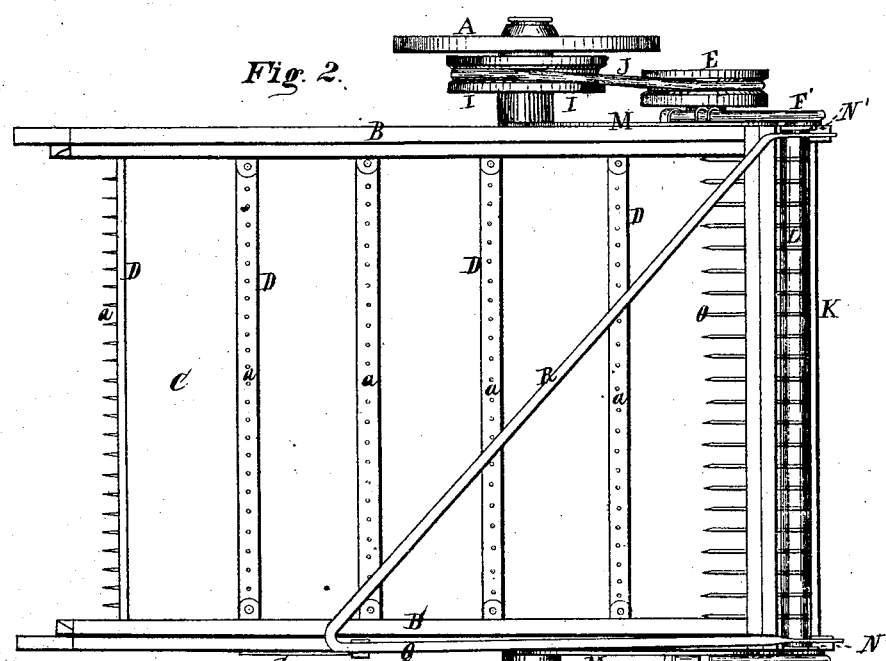

H. V. HAWKINS.
Hay-Loader.

No. 159,264.  Patented Feb. 2, 1875.

Witnesses.  
H. F. Cornell  
R. C. Cady

Inventor.  
Homer V. Hawkins,  
Per Burridge & Co. — Att'ys,  
Cleveland, Ohio.

THE GRAPHIC CO. PHOTO-LITH. 39 & 41 PARK PLACE, N.Y.

UNITED STATES PATENT OFFICE.

HOMER V. HAWKINS, OF AMBOY, ILLINOIS.

IMPROVEMENT IN HAY-LOADERS.

Specification forming part of Letters Patent No. 159,264, dated February 2, 1375; application filed December 5, 1874.

*To all whom it may concern:*

Be it known that I, HOMER V. HAWKINS, of Amboy, in the county of Lee and State of Illinois, have invented a new and useful Improvement in Hay-Loaders, of which the following is a description, reference being had to the accompanying drawings making a part of this specification, in which—

Figure 3:
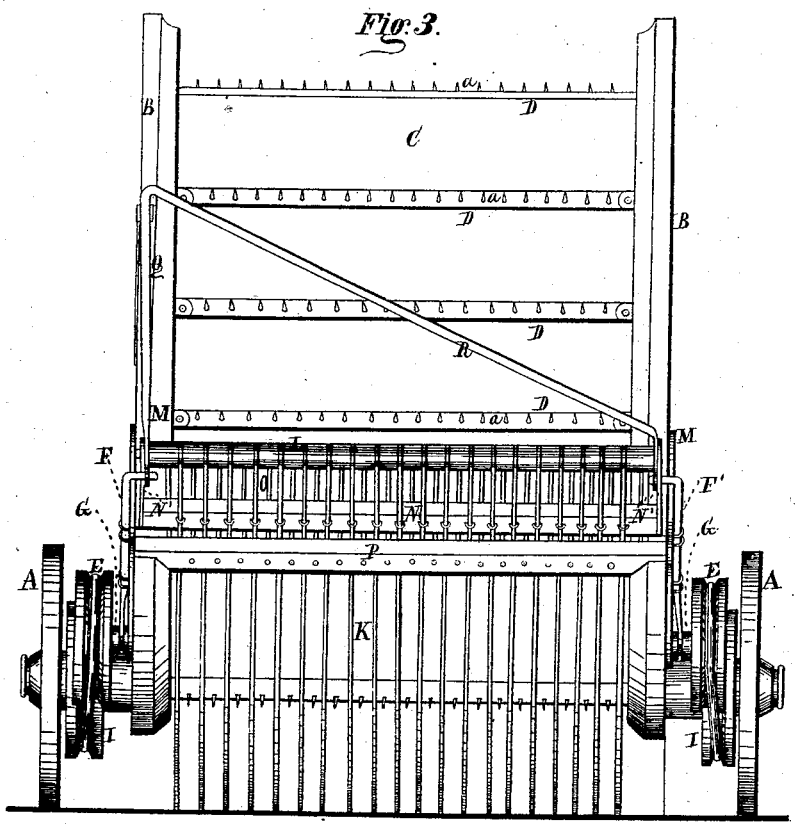
Figure 4:
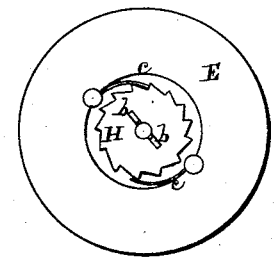
Figure 5:
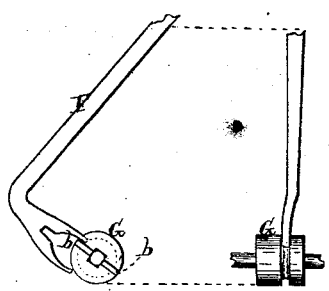

Figure 1 is a side view of the machine. Fig. 2 is a plan view. Fig. 3 is a view of the rear end. Figs. 4 and 5 are detached sections.

Like letters of reference refer to like parts in the several views.

The object of this invention is to rake up hay in the field and load the same onto the wagon, by the co-operation of a rake and an elevator. The construction and operation of the same are as follows:

On the wheels A, Fig. 2, is mounted an elevator, consisting of the sides B, and endless apron C, provided with a series of cross-bars, D, armed with studs or points $a$. On each end of the shaft, around which the lower part of the apron passes, is secured a loose band-pulley, E, which revolves freely upon the shaft except when, by the lever F, it is made to engage with the adjustable collar or clutch G, fitted loosely to the shaft, so that it may slide thereon for engaging the pulley F. The eye in the clutch is square, thus fitting the square part of the shaft, hence it cannot turn thereon, though free to slide to engage the pulley, whereby it is revolved together with the shaft, by means of the lugs $b$, Fig. 4, secured to, and projecting from, the ratchet-wheel H. The shaft is made to revolve with the pulley in one direction by the wheel H and springs $c$, thereby operating the apron. The pulley E is operated by the wheel I and belt J. Said wheel is attached to the driving-wheels A. The upper ends of the teeth of rake K are secured in the bar L, Fig. 2; for further security they are also attached to the bar N, Fig. 3. The said bars are connected to each other by sides N', which, together with the bars, form a frame. Said frame is pivoted at the points $d$ in the stays M, so that it may vibrate for elevating the rake from the ground, and not clutch or drag therein. Projecting forward over the lower end of the apron or elevator is arranged a series of teeth or prongs, O, Fig. 2, secured in the bar P, Fig. 3, the purpose of which will presently be shown. The lever F, above referred to, is for shifting the collar or clutch G, whereby the apron is thrown into and out of gear with the pulley E. The lever is also used for elevating the rake from the ground, to prevent it from catching in the stubble, roots, lumps, or inequalities of the ground while the machine is being moved from place to place, but not for dumping hay gathered thereby. For these purposes the lower end of the lever is bifurcated and lodged in the groove of the clutch, as shown in Fig. 5. The upper end of the lever is bent at right angles, and loosely secured to the arm Q. On the opposite end of the rake is a similar pulley, clutch, and lever, operating substantially in the same way, and for the same purposes. The lever F', on that side, is loosely attached to the arm R. Both of the arms Q and R are attached to the lever S, whereby said levers F F' are actuated for operating the clutch or clutches for engaging or disengaging the apron or carrier with the pulleys E E, and for elevating the rake.

The practical operation of the machine is as follows: It is attached to the rear end of a wagon into which the hay is to be loaded, by means of the reach A'. The position of the machine when thus attached to the wagon is as shown in Fig. 1. The wagon is now driven forward, followed by the rake, which rakes up the hay as an ordinary rake would do. As fast as the hay is gathered by the rake it is carried therefrom by the endless apron upward, and deposited upon the wagon. The teeth or studs $a$ projecting from the cross-bars of the apron prevent the hay from sliding back or down upon the rake—at the same time hold it upon the elevator while it is being carried up or taken from the rake to the incline above the rake.

To prevent too much hay from passing from the rake at once to the incline of the elevator, and thereby clogging or obstructing the free movement of the apron, is the purpose of the teeth or prongs O, under which the hay must pass from the rake. They also prevent the return of the hay to the rake in the event the apron should in any way fail to carry up the hay.

By the use of this machine the hay is raked directly from the swath and deposited on the wagon, thereby saving the time, labor, and the use of extra team, to first rake up the hay into windrows, from which it is taken and thrown onto the wagon, as ordinarily done.

In order to move the machine from place to place, the rake is lifted from the ground by operating the lever S, which, on being moved from its position (shown in Fig. 1) to that indicated by the dotted line a', draws, by means of the arms Q R, on the upper bar of the head of the rake. The head of the rake being pivated in the stays M at the points d, as above described, when drawn upon by the lever and arms Q R, as aforesaid, will vibrate, thereby lifting up the rake from the ground just enough to clear it. At the same time the levers F F' are partially revolved by their connection with the arms Q R, which will cause the disengagement of the clutch or collar G with the pulley E, thereby allowing the wheels A to run independent of the elevator, in which condition of the machine it can be moved from place to place without raking, or the operation of the elevator.

By means of the wheel H and springs c, the machine can be turned around or backed without operating the apron.

What I claim as my invention, and desire to secure by Letters Patent, is—

1. The rake K, having its head, consisting of the bars L N and sides N', pivoted in the stays M M, so that the rake may vibrate therein, in combination with the rotating levers F F', arms Q R, and lever S, substantially in the manner as described, and for the purpose specified.

2. The combination of the rake K and elevator, consisting of the sides B, apron C, having bars D, provided with studs a, teeth O, pulleys E I, and wheels A, as and for the purposes specified.

HOMER V. HAWKINS.

Witnesses:
W. H. BURRIDGE,
E. N. WRIGHT.